United States Patent
He et al.

(10) Patent No.: US 11,315,243 B2
(45) Date of Patent: Apr. 26, 2022

(54) X-RAY IMAGE PROCESSING METHOD AND SYSTEM AND COMPUTER STORAGE MEDIUM

(71) Applicant: Siemens Healthcare GmbH, Erlangen (DE)

(72) Inventors: Wei He, Shanghai (CN); Thomas Mertelmeier, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 92 days.

(21) Appl. No.: 16/637,374

(22) PCT Filed: Aug. 9, 2018

(86) PCT No.: PCT/EP2018/071686
§ 371 (c)(1),
(2) Date: Feb. 7, 2020

(87) PCT Pub. No.: WO2019/030348
PCT Pub. Date: Feb. 14, 2019

(65) Prior Publication Data
US 2020/0211183 A1    Jul. 2, 2020

(30) Foreign Application Priority Data

Aug. 10, 2017   (CN) .......................... 201710680197.1

(51) Int. Cl.
*G06T 7/00*    (2017.01)
*G06T 7/11*    (2017.01)
*G01N 23/04*   (2018.01)

(52) U.S. Cl.
CPC ............ *G06T 7/0012* (2013.01); *G01N 23/04* (2013.01); *G06T 7/11* (2017.01); *G06T 2207/10116* (2013.01); *G06T 2207/10144* (2013.01); *G06T 2207/20221* (2013.01); *G06T 2207/30068* (2013.01)

(58) Field of Classification Search
CPC ......................... G06T 2207/20221; G06T 7/11
See application file for complete search history.

(56) References Cited

U.S. PATENT DOCUMENTS

| 7,342,999 B2 | 3/2008 | Johansson et al. |
| 9,230,311 B2 | 1/2016 | Bullard et al. |

(Continued)

FOREIGN PATENT DOCUMENTS

| CN | 101224114 A | 7/2008 |
| CN | 103384497 A | 11/2013 |

(Continued)

OTHER PUBLICATIONS

"Normalization (image processing)—Wikipedia, the free encyclopedia", Dec. 14, 2012 Retrieved from the Internet: URL:https://web.archive.org/web/20121214085703/http://en.wikipedia.org/wiki/Normalization_(image_processing)—retrieved on Jan. 23, 2014—p. 1.

(Continued)

*Primary Examiner* — Gandhi Thirugnanam
(74) *Attorney, Agent, or Firm* — Banner & Witcoff, Ltd.

(57) ABSTRACT

The present disclosure relates to techniques to expand the dynamic range of a detector and achieve smooth transition in images used for X-ray image processing. The image finally obtained can fully retain useful information.

9 Claims, 4 Drawing Sheets

(56) References Cited

U.S. PATENT DOCUMENTS

| | | | | |
|---|---|---|---|---|
| 2008/0161683 A1* | 7/2008 | Andersson | ............. | A61B 6/505 |
| | | | | 600/425 |
| 2010/0150473 A1* | 6/2010 | Kwon | ....................... | G06T 5/50 |
| | | | | 382/284 |
| 2013/0272495 A1* | 10/2013 | Bullard | .................. | A61B 6/482 |
| | | | | 378/37 |
| 2017/0091550 A1* | 3/2017 | Feng | ......................... | G06T 7/38 |
| 2020/0211183 A1* | 7/2020 | He | ............................ | G06T 5/50 |
| 2020/0242763 A1* | 7/2020 | Bhuiyan | .................. | G06T 7/12 |

FOREIGN PATENT DOCUMENTS

| | | |
|---|---|---|
| CN | 103838244 A | 6/2014 |
| EP | 2199975 A1 | 6/2010 |
| WO | 2012/104336 A1 | 8/2012 |

OTHER PUBLICATIONS

International Search Report and The Written Opinion of the International Searching Authority dated Oct. 29, 2018.

* cited by examiner

X-RAY IMAGE PROCESSING METHOD AND SYSTEM AND COMPUTER STORAGE MEDIUM

CROSS-REFERENCE TO RELATED APPLICATIONS

The present application is a national stage entry of PCT application no. PCT/EP2018/071686, filed on Aug. 9, 2018, which claims the benefit of the filing date of China patent application no. 201710680197.1, filed on Aug. 10, 2017, the contents of which are incorporated herein by reference in their entirety.

TECHNICAL FIELD

The present disclosure relates to the technical field of medical equipment, in particular an X-ray image processing method and system and a computer storage medium.

BACKGROUND

In X-ray examinations at the present time, saturation will generally occur in some regions of the image obtained, resulting in the loss of required information. With regards breast examinations, in the case of large breasts, and in particular in the case of the thickest parts, it is generally necessary to increase the radiation dosage, but this will lead to image saturation in regions of low attenuation such as skin boundaries and nipples, thereby causing the loss of information. However, this portion of lost information is required by the doctor. This problem often occurs in cases where the dynamic range of the detector is small or a physical anti-scatter grid is not used.

A breast imaging method is disclosed in the patent document with publication no. CN103384497A.

A real-time image fusion method and a corresponding apparatus are disclosed in the patent document with publication no. CN103838244A.

However, none of the various solutions proposed in the prior art is able to achieve smooth transition in X-ray images after processing; this affects observation of associated regions in images by doctors and in turn affects disease diagnosis.

CONTENT OF THE DISCLOSURE

In view of the above, the present disclosure proposes an X-ray image processing method, an X-ray image processing system, and a computer storage medium.

According to one embodiment, the X-ray image processing method comprises: successively acquiring a first image and a second image of an examination subject with different exposure parameters; determining a boundary line of the examination subject in the second image, the boundary line dividing the second image into a first region and a second region; subjecting the first region and/or the second region to normalization on the basis of a boundary line pixel value of the examination subject; determining, in the first image, a third region and a fourth region corresponding to the first region and the second region respectively, according to a pixel point coordinate correspondence relationship between the first image and the second image; and allocating weighting factors for the first to the fourth regions respectively, and fusing the first region with the third region and the second region with the fourth region on the basis of the weighting factors, to form a third image.

Optionally, the X-ray image processing method may further comprise: determining a dividing line in the second region of the second image according to a preset (e.g. predetermined) pixel value, the dividing line dividing the second region into a first sub-region and a second sub-region; determining, in the fourth region of the first image, a third sub-region and a fourth sub-region corresponding to the first sub-region and the second sub-region respectively, according to a pixel point coordinate correspondence relationship between the first image and the second image; and allocating weighting factors for the first region, the third region, and the first to the fourth sub-regions respectively, and fusing the first region with the third region, the first sub-region with the third sub-region, and the second sub-region with the fourth sub-region on the basis of the weighting factors, to form the third image.

Optionally, the first image may be a low radiation dose image, and the second image may be a high radiation dose image.

Optionally, the boundary line pixel value may be a mean value of pixel values of all pixel points in a preset (e.g. predetermined) range close to a boundary of the examination subject in the second image.

Optionally, fusion may be performed on the basis of the following formula:

$$P3(x,y)=w1(x,y)*P1(x,y)+w2(x,y)*P2(x,y)$$

where $P1(x, y)$ represents a pixel value of each pixel point in the first image, $P2(x, y)$ represents a pixel value of each pixel point in the second image, $P3(x, y)$ represents a pixel value of each pixel point in the third image, $w1(x, y)$ represents a weighting factor for each pixel point in the first image, and $w2(x, y)$ represents a weighting factor for each pixel point in the second image.

Optionally, the weighting factor $w2(x, y)$ satisfies the following formula:

$$w2(x, y) = \begin{cases} a \\ \frac{(\text{Max}Pt(x, y) - Pt(x, y))}{(\text{Max}Pt(x, y) - \text{Min}Pt(x, y))} *|a-b| + \text{Min}(a, b) \\ b \end{cases}$$

where a represents a weighting factor in the first region, $$\frac{(\text{Max}Pt(x, y) - Pt(x, y))}{(\text{Max}Pt(x, y) - \text{Min}Pt(x, y))} *|a-b| + \text{Min}(a, b)$$

represents a weighting factor in the first sub-region, b represents a weighting factor in the second sub-region, $Pt(x, y)$ represents a pixel value of each pixel point in the first sub-region, $\text{Max}Pt(x, y)$ represents a maximum pixel value in the first sub-region, $\text{Min}Pt(x, y)$ represents a minimum pixel value in the first sub-region, and $\text{Min}(a, b)$ represents a minimum value of a and b;

wherein a and b may be preset (e.g. predetermined) fixed values or, respectively, ratios of pixel point pixel values at corresponding positions in the first image and the first region and second sub-region of the second image.

Optionally, the weighting factor $w1(x, y)$ satisfies the following formula:

$$w1(x,y)=1-w2(x,y).$$

Optionally, the X-ray image processing method may further comprise: subjecting the third image to inverse normalization.

According to one embodiment, a program instruction is stored in the computer storage medium, the program instruction being capable of being run in order to realize any one of the X-ray image processing methods described above.

According to one embodiment, the X-ray image processing system comprises: an acquisition apparatus, for successively acquiring a first image and a second image of an examination subject with different exposure parameters; a preprocessing apparatus, for determining a boundary line of the examination subject in the second image, the boundary line dividing the second image into a first region and a second region; and the preprocessing apparatus being used for subjecting the first region and/or the second region to normalization on the basis of a boundary line pixel value of the examination subject; and a processing apparatus, for determining, in the first image, a third region and a fourth region corresponding to the first region and the second region respectively, according to a pixel point coordinate correspondence relationship between the first image and the second image; and the processing apparatus being used for allocating weighting factors for the first to the fourth regions respectively, and fusing the first region with the third region and the second region with the fourth region on the basis of the weighting factors, to form a third image.

Optionally, the X-ray image processing system may further comprise: a dividing apparatus, for determining a dividing line in the second region of the second image according to a preset (e.g. predetermined) pixel value, the dividing line dividing the second region into a first sub-region and a second sub-region; the processing apparatus being further used for determining, in the fourth region of the first image, a third sub-region and a fourth sub-region corresponding to the first sub-region and the second sub-region respectively, according to a pixel point coordinate correspondence relationship between the first image and the second image; and allocating weighting factors for the first region, the third region, and the first to the fourth sub-regions respectively, and fusing the first region with the third region, the first sub-region with the third sub-region, and the second sub-region with the fourth sub-region on the basis of the weighting factors, to form the third image.

Optionally, the first image may be a low radiation dose image, and the second image may be a high radiation dose image.

Optionally, the boundary line pixel value may be a mean value of pixel values of all pixel points in a preset (e.g. predetermined) range close to a boundary of the examination subject in the second image.

Optionally, fusion is performed on the basis of the following formula:

$$P3(x,y)=w1(x,y)*P1(x,y)+w2(x,y)*P2(x,y)$$

where $P1(x, y)$ represents a pixel value of each pixel point in the first image, $P2(x, y)$ represents a pixel value of each pixel point in the second image, $P3(x, y)$ represents a pixel value of each pixel point in the third image, $w1(x, y)$ represents a weighting factor for each pixel point in the first image, and $w2(x, y)$ represents a weighting factor for each pixel point in the second image.

Optionally, the weighting factor $w2(x, y)$ satisfies the following formula:

$$w2(x, y) = \begin{cases} a \\ \frac{(\text{Max}Pt(x, y) - Pt(x, y))}{(\text{Max}Pt(x, y) - \text{Min}Pt(x, y))} *|a-b| + \text{Min}(a, b) \\ b \end{cases}$$

where a represents a weighting factor in the first region, $$\frac{(\text{Max}Pt(x, y) - Pt(x, y))}{(\text{Max}Pt(x, y) - \text{Min}Pt(x, y))} *|a-b| + \text{Min}(a, b)$$

represents a weighting factor in the first sub-region, b represents a weighting factor in the second sub-region, $Pt(x, y)$ represents a pixel value of each pixel point in the first sub-region, $\text{Max}Pt(x, y)$ represents a maximum pixel value in the first sub-region, $\text{Min}Pt(x, y)$ represents a minimum pixel value in the first sub-region, and $\text{Min}(a, b)$ represents a minimum value of a and b;

wherein a and b may be preset (e.g. predetermined) fixed values or, respectively, ratios of pixel point pixel values at corresponding positions in the first image and the first region and second sub-region of the second image.

Optionally, the weighting factor $w1(x, y)$ satisfies the following formula:

$$w1(x,y)=1-w2(x,y).$$

Optionally, the processing apparatus is further used for subjecting the third image to inverse normalization.

The present disclosure combines images having high dynamic ranges in images of two exposures, can expand the dynamic range of a detector and achieve smooth transition in images, and the image finally obtained can retain complete useful information.

DESCRIPTION OF THE ACCOMPANYING DRAWINGS

Embodiments of the present disclosure are described in detail below with reference to the accompanying drawings, to give those skilled in the art a clearer understanding of the abovementioned and other features and advantages of the present disclosure.

KEY TO THE DRAWINGS

Figure 1:
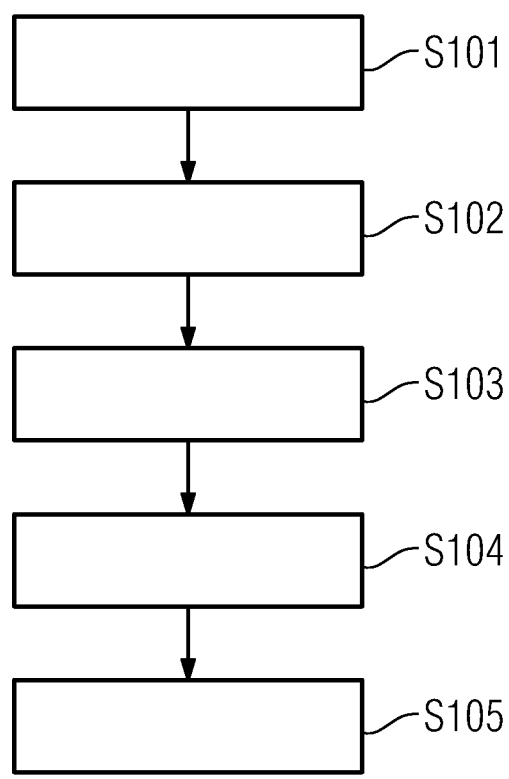
FIG. 1 is a schematic flow chart of an example X-ray image processing method according to an embodiment of the present disclosure.

| | |
|---|---|
| S101-S105 | steps |
| S501-S503 | steps |
| 600, 700 | X-ray image processing system |
| 610, 710 | acquisition apparatus |
| 620, 720 | preprocessing apparatus |
| 630, 730 | processing apparatus |
| 740 | dividing apparatus |
| L | boundary line |

Particular Embodiments

To enable clearer understanding of the technical features, objectives and effects of the disclosure, particular embodiments of the present disclosure are now explained with reference to the accompanying drawings, in which identical labels indicate identical parts.

As used herein, "schematic" means "serving as an instance, example or illustration". No drawing or embodiment described herein as "schematic" should be interpreted as a more preferred or more advantageous technical solution.

To make the drawings appear uncluttered, only those parts relevant to the present disclosure are shown schematically in the drawings; they do not represent the actual structure thereof as a product. Furthermore, to make the drawings appear uncluttered for ease of understanding, in the case of components having the same structure or function in certain drawings, only one of these is drawn schematically, or only one is marked.

In this text, "a" does not only mean "just this one"; it may also mean "more than one". As used herein, "first" and "second" etc. are merely used to differentiate between parts, not to indicate their order or degree of importance, or any precondition of mutual existence, etc.

FIG. 1 is referred to first; FIG. 1 is a schematic flow chart of an X-ray image processing method according to an embodiment of the present disclosure. In the embodiment shown in FIG. 1, the X-ray image processing method comprises the following steps:

step S101: successively acquiring a first image and a second image;

step S102: determining a boundary line of an examination subject in the second image, and dividing the second image into a first region and a second region;

step S103: subjecting the first region and/or the second region to normalization on the basis of a boundary line pixel value of the examination subject;

step S104: determining a third region and a fourth region in the first image; and step S105: allocating weighting factors for the first to the fourth regions, and fusing the first region with the third region and the second region with the fourth region on the basis of the weighting factors.

In step S101, a first image and a second image of an examination subject are successively acquired with different exposure parameters. In practice, two images are successively acquired with different exposure parameters, e.g. photographing the examination subject with a low radiation dose (abbreviated as low dose) capable of ensuring that saturation will not occur and acquiring a first image, then photographing the examination subject with an ample radiation dose (abbreviated as high dose) and acquiring a second image; information of regions of relatively thick tissue in the examination subject can be fully presented in the second image. As will be readily understood by those skilled in the art, the low dose and high dose indicated here can be set according to the circumstances of a particular examination subject.

Figure 2:
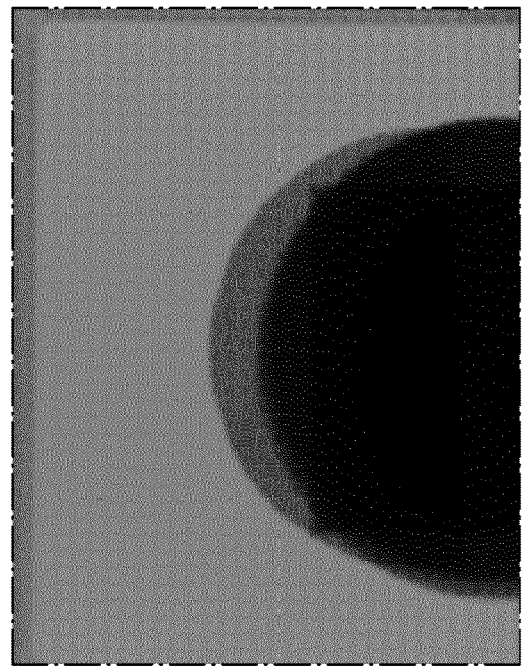
FIG. 2 is a schematic figure of an example low dose image acquired according to an embodiment of the present disclosure.
Figure 3:
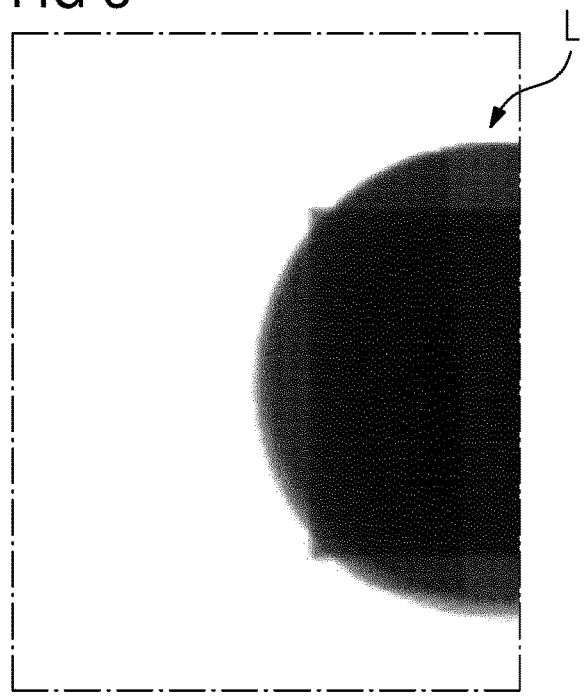
FIG. 3 is a schematic figure of an example high dose image acquired according to an embodiment of the present disclosure.

Reference is made to FIGS. 2 and 3, which are schematic figures obtained using a model as an examination subject (e.g. subjecting a simulated breast to a breast examination). FIG. 2 is a schematic figure of a low dose image acquired in one embodiment, and FIG. 3 is a schematic figure of a high dose image acquired in one embodiment. As the figures show, the low dose image shown in FIG. 2 shows two semicircular regions on an inner side and an outer side; the outer-side region simulates a skin region of the examination subject, and the inner-side region simulates an organ region of the examination subject (e.g. a breast), but detail information of the organ region part in FIG. 2 is not clear. The high dose image shown in FIG. 3 only shows information of an organ region, and although detail information of this part can be clearly presented, necessary information of a skin region is lost due to image saturation. In other words, as shown in FIG. 3, apart from the organ region, images of the remaining parts all become blank regions due to saturation.

In step S102, a boundary line of an examination subject is determined in the second image, and the boundary line divides the second image into a first region and a second region. For example, taking FIG. 3 as an example, a boundary line L of an organ region (examination subject) is determined in FIG. 3, the boundary line L being a continuous line and dividing FIG. 3 into a first region and a second region. Those skilled in the art may use a suitable image processing method to realize boundary extraction; the present disclosure does not provide a superfluous description here.

As will be readily understood, since the second image is a high radiation dose image, as shown in FIG. 3, the determination of the boundary of the examination subject in the image is easier. However, the present disclosure is not restricted in this respect; those skilled in the art could also choose to determine the boundary of the examination subject in the first image (i.e. the low radiation dose image) as required, and this would still fall within the scope of the present disclosure.

In step S103, the first region and/or the second region is/are subjected to normalization on the basis of a boundary line pixel value of the examination subject. Optionally, the boundary line pixel value may be determined by calculating a mean value of pixel values of all pixel points in a preset (e.g. predetermined) range close to the boundary of the examination subject in the second image. In another embodiment, those skilled in the art could also choose to set an empirical pixel value as the boundary line pixel value here, according to the application scenario and the circumstances of the examination subject.

In an embodiment, the case where both the first region and the second region are subjected to normalization is taken as an example for explanation. For instance, pixel values of all pixel points in the first region and the second region are all normalized to the range of 0 to 1 (or within any set pixel value range). Furthermore, it is possible for pixel values of all pixel points in the first region and the second region to be respectively normalized to different pixel value ranges. However, the present disclosure is not limited to the above-mentioned content; those skilled in the art would readily think of only subjecting one of the first region and the second region to normalization, or subjecting a part of the first region and/or the second region to normalization, without departing from the principles taught in the present disclosure.

In step S104, a third region and a fourth region corresponding to the first region and the second region, respectively, are determined in the first image, according to a pixel point coordinate correspondence relationship between the first image and the second image. Since the first image and the second image are successively acquired images, with the two image acquisitions differing only in the size of the radiation dose, the positions of all the pixel point coordinates on the two images obtained are identical, and the coordinate correspondence relationship between the pixel points can be used to determine the regions in the first image which respectively correspond to the regions in the second image.

In step S105, weighting factors are allocated for the first to the fourth regions, respectively, and the first region is fused with the third region and the second region is fused with the fourth region on the basis of the weighting factors, to form a fused third image.

Figure 4:
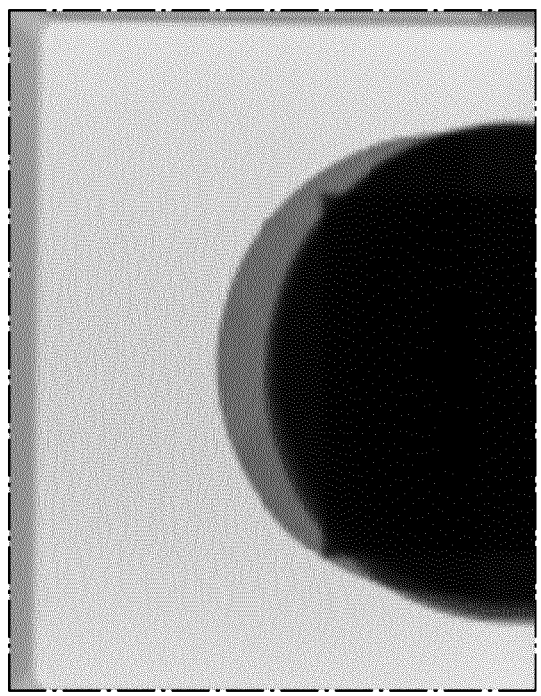
FIG. 4 is a schematic figure of an example fused image obtained according to an embodiment of the present disclosure.

Reference is made to FIG. 4, which is a schematic figure of a fused image obtained in one embodiment. As shown in FIG. 4, the fused image can completely retain content of all parts of the examination subject and clearly show detail information.

In a schematic embodiment, the X-ray image processing method may also comprise the following steps:

step S201: determining a dividing line in the second region according to a preset (e.g. predetermined) pixel value, and dividing the second region into a first sub-region and a second sub-region;

step S202: determining a third sub-region and a fourth sub-region in the fourth region of the first image, according to a pixel point coordinate correspondence relationship between the first image and the second image; and step S203: allocating weighting factors for the first region, the third region, and the first to the fourth sub-regions respectively, and fusing the first region with the third region, the first sub-region with the third sub-region, and the second sub-region with the fourth sub-region on the basis of the weighting factors.

Figure 5:
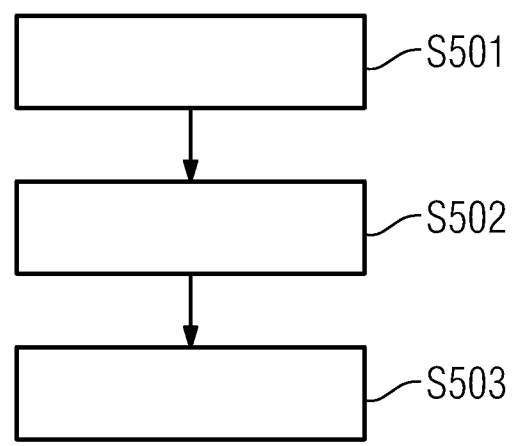
FIG. 5 is a schematic flow chart of an example X-ray image processing method according to an embodiment of the present disclosure.

Reference is made to FIG. 5, which is a schematic flow chart of an X-ray image processing method according to another embodiment of the present disclosure, only showing those steps which are further included in the X-ray image processing method in this embodiment, compared with the method shown in FIG. 1.

In step S201, a preset (e.g. predetermined) pixel value can be set according to the circumstances of the examination subject, a dividing line can be determined in the second region of the second image according to the preset (e.g. predetermined) pixel value, and the dividing line can be used to divide the second region into a first sub-region and a second sub-region. Still using the case of a breast examination as an example for explanation, at this time the first region represents a skin region, and the second region represents an organ region; the second sub-region represents an organ core region (including a breast part of interest), and the first sub-region represents a transition region between the skin region and the organ core region.

In step S202, as stated above, there exists a correspondence relationship between the pixel point coordinates of the first image and the second image, and this correspondence relationship is used to determine a third sub-region and a fourth sub-region, corresponding to the first sub-region and the second sub-region respectively, in the fourth region of the first image.

In step S203, weighting factors are allocated for the first region, the third region, and the first to the fourth sub-regions respectively, and the first region is fused with the third region, the first sub-region is fused with the third sub-region, and the second sub-region is fused with the fourth sub-region on the basis of the weighting factors, to form a third image. In other words, through steps S202 and S203, the two images have already been respectively divided into three regions, i.e. the skin region, the transition region and the organ core region, and are fused according to corresponding regions respectively to obtain a fused image.

The process of fusion is described in detail below.

In the X-ray image processing methods presented above, fusion may be performed on the basis of the following formula (1):

$$P3(x,y)=w1(x,y)*P1(x,y)+w2(x,y)*P2(x,y) \quad (1)$$

where $P1(x, y)$ represents a pixel value of each pixel point in the first image (low radiation dose image), $P2(x, y)$ represents a pixel value of each pixel point in the second image (high radiation dose image), $P3(x, y)$ represents a pixel value of each pixel point in the third image (fused image), $w1(x, y)$ represents a weighting factor for each pixel point in the first image, and $w2(x, y)$ represents a weighting factor for each pixel point in the second image.

The weighting factor $w2(x, y)$ of the second image satisfies the following formula (2):

$$w2(x,y) = \begin{cases} a \\ \frac{(\text{Max}Pt(x,y) - Pt(x,y))}{(\text{Max}Pt(x,y) - \text{Min}Pt(x,y))} * |a-b| + \text{Min}(a,b) \\ b \end{cases} \quad (2)$$

where a represents a weighting factor in the first region (skin region), $$\frac{(\text{Max}Pt(x,y) - Pt(x,y))}{(\text{Max}Pt(x,y) - \text{Min}Pt(x,y))} * |a-b| + \text{Min}(a,b)$$

represents a weighting factor in the first sub-region (transition region), b represents a weighting factor in the second sub-region (organ core region), Pt(x, y) represents a pixel value of each pixel point in the first sub-region, MaxPt(x, y) represents a maximum pixel value in the first sub-region, MinPt(x, y) represents a minimum pixel value in the first sub-region, and Min(a, b) represents a minimum value of a and b;

wherein a and b may be preset (e.g. predetermined) fixed values or, respectively, ratios of pixel point pixel values at corresponding positions in the first image and the first region and second sub-region of the second image.

As will be readily understood, for the image divided into regions, each region has a different weighting factor calculation formula, wherein the weighting factors of the skin region and the organ core region may be preset (e.g. predetermined) as fixed values according to actual circumstances, or be set relatively by means of a pixel value ratio relationship between the two images; the present disclosure is not restricted in this respect.

The weighting factor $w1(x, y)$ of the first image satisfies the following formula (3):

$$w1(x,y)=1-w2(x,y) \quad (3)$$

In this way, it is possible to calculate the weighting factors of each image, and calculate the pixel value of each pixel point of the fused image according to formula (1).

Optionally, the X-ray image processing method may further comprise subjecting the third image to inverse normalization.

Figure 6:
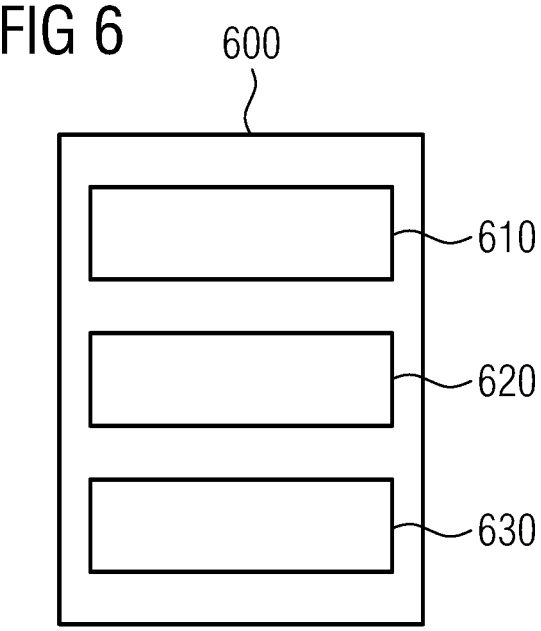
FIG. 6 is a schematic block diagram of an example X-ray image processing system according to an embodiment of the present disclosure.

The present disclosure also provides an X-ray image processing system, which is explained below with reference to FIG. 6. FIG. 6 is a schematic block diagram of an X-ray image processing system according to an embodiment of the present disclosure. As shown in FIG. 6, the X-ray image processing system 600 comprises an acquisition apparatus 610, a preprocessing apparatus 620 and a processing apparatus 630.

The acquisition apparatus 610 is used for successively acquiring a first image and a second image of an examination subject with different exposure parameters. The preprocessing apparatus 620 is used for determining a boundary line of the examination subject in the second image, the boundary line dividing the second image into a first region and a second region; and the preprocessing apparatus 620 is used for subjecting the first region and/or the second region to normalization on the basis of a boundary line pixel value of the examination subject.

The processing apparatus 630 is used for determining, in the first image, a third region and a fourth region corresponding to the first region and the second region respectively, according to a pixel point coordinate correspondence relationship between the first image and the second image; and the processing apparatus 630 is used for allocating weighting factors for the first to the fourth regions respectively, and fusing the first region with the third region and the second region with the fourth region on the basis of the weighting factors, to form a third image.

Figure 7:
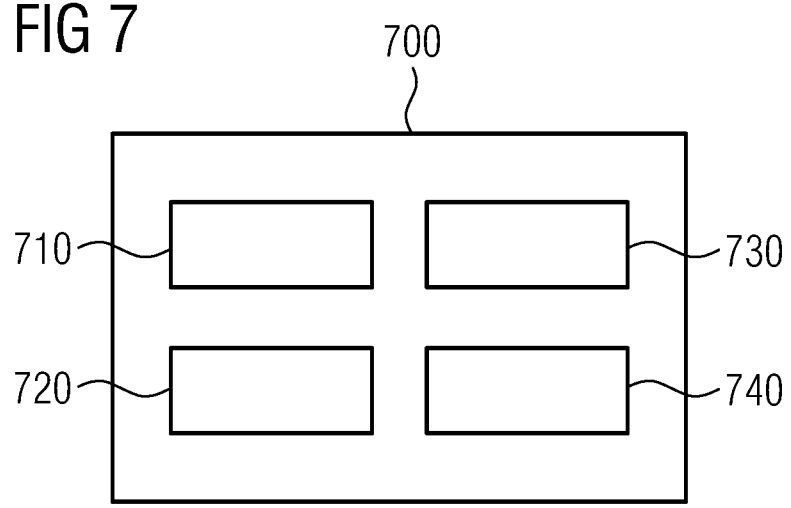
FIG. 7 is a schematic block diagram of an example X-ray image processing system according to an embodiment of the present disclosure.

An X-ray image processing system 700 of another form in a variant embodiment is described with reference to FIG. 7. FIG. 7 is a schematic block diagram of an X-ray image processing system according to another embodiment of the present disclosure. As shown in FIG. 7, the X-ray image processing system 700 comprises an acquisition apparatus 710, a preprocessing apparatus 720, a processing apparatus 730 and a dividing apparatus 740. The acquisition apparatus 710, preprocessing apparatus 720 and processing apparatus 730 are similar in function to the corresponding components in the embodiment shown in FIG. 6, so are not described superfluously here; the emphasis below is on presenting the differences between the X-ray image processing system 700 and the X-ray image processing system 600.

The dividing apparatus 740 is used for determining a dividing line in the second region of the second image according to a preset (e.g. predetermined) pixel value, the dividing line dividing the second region into a first sub-region and a second sub-region. The processing apparatus 730 is further used for determining, in the fourth region of the first image, a third sub-region and a fourth sub-region corresponding to the first sub-region and the second sub-region respectively, according to a pixel point coordinate correspondence relationship between the first image and the second image; and allocating weighting factors for the first region, the third region, and the first to the fourth sub-regions respectively, and fusing the first region with the third region, the first sub-region with the third sub-region, and the second sub-region with the fourth sub-region on the basis of the weighting factors, to form the third image.

The first image may be a low radiation dose image; the second image may be a high radiation dose image. In practice, there is no restriction on the order in which the high and low dose images are acquired; the order may be selected according to actual circumstances.

Optionally, the boundary line pixel value may be a mean value of pixel values of all pixel points in a preset (e.g. predetermined) range close to a boundary of the examination subject in the second image.

Fusion may be performed on the basis of the following formula (4):

$$P3(x,y)=w1(x,y)*P1(x,y)+w2(x,y)*P2(x,y) \quad (4)$$

where $P1(x, y)$ represents a pixel value of each pixel point in the first image, $P2(x, y)$ represents a pixel value of each pixel point in the second image, $P3(x, y)$ represents a pixel value of each pixel point in the third image, $w1(x, y)$ represents a weighting factor for each pixel point in the first image, and $w2(x, y)$ represents a weighting factor for each pixel point in the second image.

The weighting factor $w2(x, y)$ of the second image satisfies the following formula (5):

$$w2(x, y) = \begin{cases} a \\ \dfrac{(\mathrm{Max}Pt(x, y) - Pt(x, y))}{(\mathrm{Max}Pt(x, y) - \mathrm{Min}Pt(x, y))} * |a - b| + \mathrm{Min}(a, b) \\ b \end{cases} \quad (5)$$

where a represents a weighting factor in the first region, $$\dfrac{(\mathrm{Max}Pt(x, y) - Pt(x, y))}{(\mathrm{Max}Pt(x, y) - \mathrm{Min}Pt(x, y))} * |a - b| + \mathrm{Min}(a, b)$$

represents a weighting factor in the first sub-region, b represents a weighting factor in the second sub-region, Pt(x, y) represents a pixel value of each pixel point in the first sub-region, MaxPt(x, y) represents a maximum pixel value in the first sub-region, MinPt(x, y) represents a minimum pixel value in the first sub-region, and Min(a, b) represents a minimum value of a and b;

wherein a and b may be preset (e.g. predetermined) fixed values or, respectively, ratios of pixel point pixel values at corresponding positions in the first image and the first region and second sub-region of the second image.

The weighting factor $w1(x, y)$ of the first image satisfies the following formula (6):

$$w1(x,y)=1-w2(x,y) \quad (6)$$

wherein the processing apparatuses 630 and 730 may also be used for subjecting the third image to inverse normalization.

The X-ray image processing methods in the embodiments above may be applied in the X-ray image processing systems. The present disclosure combines images having high dynamic ranges in images of two exposures, can expand the dynamic range of a detector and achieve smooth transition in images, and the image finally obtained can retain complete useful information.

The present disclosure relates to an X-ray image processing method and system and a computer storage medium (e.g. a non-transitory computer-readable medium). The X-ray image processing method comprises: successively acquiring first and second images of an examination subject with different exposure parameters; determining a boundary line of the examination subject in the second image, and dividing the second image into first and second regions; subjecting the first region and/or the second region to normalization on the basis of a boundary line pixel value of the examination subject; determining, in the first image, third and fourth regions corresponding to the first and second regions, according to a pixel point coordinate correspondence relationship between the first and second images; and allocating weighting factors for the first to the fourth regions, and fusing the first region with the third region and the second region with the fourth region on the basis of the weighting factors, to form a third image. The present disclosure can expand the dynamic range of a detector and achieve smooth transition in images, and the image finally obtained can retain complete useful information.

The present disclosure also provides a computer storage medium (e.g. a non-transitory computer-readable medium); according to one embodiment, a program instruction is stored in the computer storage medium, the program instruction being capable of being run in order to realize any one of the X-ray image processing methods described above. Specifically, a system or apparatus equipped with a storage medium may be provided; software program code realizing the function of any one of the embodiments above is stored on the storage medium, and a computer (or CPU or MPU) of the system or apparatus is caused to read and execute the program code stored in the storage medium.

In such a situation, program code read from the storage medium can itself realize the function of any one of the embodiments above, hence the program code and the storage medium storing the program code form part of the present disclosure.

Examples of storage media used for providing program code include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, program code may be downloaded from a server computer via a communication network.

Furthermore, it should be clear that an operating system etc. operating on a computer can be made to complete a portion of or all actual operations, not only through the execution of program code read by a computer, but also by means of instructions based on program code, so as to realize the function of any one of the embodiments above.

In addition, it can be understood that program code read out from the storage medium is written into a memory installed in an expansion board inserted in the computer, or written into a memory installed in an expansion unit connected to the computer, and thereafter instructions based on the program code make a CPU etc. installed on the expansion board or expansion unit execute a portion of and all actual operations, so as to realize the function of any one of the embodiments above.

The above are merely embodiments of the present disclosure, which are not intended to limit it. Any amendments, equivalent substitutions or improvements etc. made within the spirit and principles of the present disclosure shall be included in the scope of protection thereof.

The invention claimed is:

1. An X-ray image processing method, comprising:
successively acquiring a first image and a second image of an examination subject with different exposure parameters, the first image being a low radiation dose image and the second image being a high radiation dose image;
determining a boundary line of the examination subject in the second image, the boundary line dividing the second image into a first region and a second region;
subjecting the first region and/or the second region to normalization on the basis of a boundary line pixel value of the examination subject, the boundary line pixel value representing a mean value of pixel values for pixel points in a predetermined range of the boundary line of the examination subject in the second image;
determining, in the first image, a third region and a fourth region corresponding to the first region and the second region respectively, according to a pixel point coordinate correspondence relationship between the first image and the second image;
determining a dividing line in the second region of the second image according to a predetermined pixel value, the dividing line dividing the second region into a first sub-region and a second sub-region;
determining, in the fourth region of the first image, a third sub-region and a fourth sub-region corresponding to the first sub-region and the second sub-region, respectively, according to a pixel point coordinate correspondence relationship between the first image and the second image; and
allocating weighting factors for the first region, the third region, and the first to the fourth sub-regions, respectively, and fusing (i) the first region with the third region, (ii) the first sub-region with the third sub-region, and (iii) the second sub-region with the fourth sub-region on the basis of the weighting factors, to form a third image.

2. The X-ray image processing method as claimed in claim 1, wherein fusion is performed on the basis of the following formula:

$$P3(x,y)=w1(x,y)*P1(x,y)+w2(x,y)*P2(x,y), \text{ and}$$
wherein:

$P1(x, y)$ represents a pixel value of each pixel point in the first image, $P2(x, y)$ represents a pixel value of each pixel point in the second image, $P3(x, y)$ represents a pixel value of each pixel point in the third image, $w1(x, y)$ represents a weighting factor for each pixel point in the first image, and $w2(x, y)$ represents a weighting factor for each pixel point in the second image.

3. The X-ray image processing method as claimed in claim 2, wherein the weighting factor $w2(x, y)$ satisfies the following formula:

$$w2(x, y) = \begin{cases} a \\ \dfrac{(\text{Max}Pt(x, y) - Pt(x, y))}{(\text{Max}Pt(x, y) - \text{Min}Pt(x, y))} *|a-b| + \text{Min}(a, b), \\ b \end{cases}$$

and wherein a represents a weighting factor in the first region, $$\dfrac{(\text{Max}Pt(x, y) - Pt(x, y))}{(\text{Max}Pt(x, y) - \text{Min}Pt(x, y))} *|a-b| + \text{Min}(a, b)$$

represents a weighting factor in the first sub-region, b represents a weighting factor in the second sub-region, Pt(x, y) represents a pixel value of each pixel point in the first sub-region, MaxPt(x, y) represents a maximum pixel value in the first sub-region, MinPt(x, y) represents a minimum pixel value in the first sub-region, Min(a, b) represents a minimum value of a and b, and a and b are predetermined fixed values or, respectively, ratios of pixel point pixel values at corresponding positions in the first image and the first region and second sub-region of the second image.

4. The X-ray image processing method as claimed in claim 3, wherein the weighting factor w1(x, y) satisfies the following formula:

$$w1(x,y)=1-w2(x,y).$$

5. A non-transitory computer-readable storage medium having instructions stored thereon, the program instructions being executed by one or more processors to:
   successively acquire a first image and a second image of an examination subject with different exposure parameters, the first image being a low radiation dose image and the second image being a high radiation dose image;
   determine a boundary line of the examination subject in the second image, the boundary line dividing the second image into a first region and a second region;
   subject the first region and/or the second region to normalization on the basis of a boundary line pixel value of the examination subject, the boundary line pixel value representing a mean value of pixel values for pixel points in a predetermined range of the boundary line of the examination subject in the second image;
   determine, in the first image, a third region and a fourth region corresponding to the first region and the second region respectively, according to a pixel point coordinate correspondence relationship between the first image and the second image;
   determine a dividing line in the second region of the second image according to a predetermined pixel value, the dividing line dividing the second region into a first sub-region and a second sub-region;
   determine, in the fourth region of the first image, a third sub-region and a fourth sub-region corresponding to the first sub-region and the second sub-region, respectively, according to a pixel point coordinate correspondence relationship between the first image and the second image; and
   allocate weighting factors for the first region, the third region, and the first to the fourth sub-regions, respectively, and fusing (i) the first region with the third region, (ii) the first sub-region with the third sub-region, and (iii) the second sub-region with the fourth sub-region on the basis of the weighting factors, to form a third image.

6. An X-ray image processing system, comprising:
   an acquisition apparatus configured to successively acquire a first image and a second image of an examination subject with different exposure parameters, the first image being a low radiation dose image and the second image being a high radiation dose image;
   a preprocessing apparatus configured to determine a boundary line of the examination subject in the second image, the boundary line dividing the second image into a first region and a second region,
   wherein the preprocessing apparatus is further configured to subject the first region and/or the second region to normalization on the basis of a boundary line pixel value of the examination subject, the boundary line pixel value representing a mean value of pixel values for pixel points in a predetermined range of the boundary line of the examination subject in the second image;
   a processing apparatus for configured to determine, in the first image, a third region and a fourth region corresponding to the first region and the second region respectively, according to a pixel point coordinate correspondence relationship between the first image and the second image; and
   a dividing apparatus configured to determine a dividing line in the second region of the second image according to a predetermined pixel value, the dividing line dividing the second region into a first sub-region and a second sub-region, and
   wherein the processing apparatus is further configured to:
   determine, in the fourth region of the first image, a third sub-region and a fourth sub-region corresponding to the first sub-region and the second sub-region, respectively, according to a pixel point coordinate correspondence relationship between the first image and the second image;
   allocate weighting factors for the first region, the third region, and the first to the fourth sub-regions, respectively; and
   fuse (i) the first region with the third region, (ii) the first sub-region with the third sub-region, and (iii) the second sub-region with the fourth sub-region on the basis of the weighting factors, to form a third image.

7. The X-ray image processing system as claimed in claim 6, wherein fusion is performed on the basis of the following formula:

$$P3(x,y)=w1(x,y)*P1(x,y)+w2(x,y)*P2(x,y), \text{ and}$$
   wherein:

P1(x, y) represents a pixel value of each pixel point in the first image,
   P2(x, y) represents a pixel value of each pixel point in the second image,
   P3(x, y) represents a pixel value of each pixel point in the third image,
   w1(x, y) represents a weighting factor for each pixel point in the first image, and
   w2(x, y) represents a weighting factor for each pixel point in the second image.

8. The X-ray image processing system as claimed in claim 7, wherein the weighting factor w2(x, y) satisfies the following formula:

$$w2(x, y) = \begin{cases} a \\ \frac{(\text{Max}Pt(x, y) - Pt(x, y))}{(\text{Max}Pt(x, y) - \text{Min}Pt(x, y))} *|a-b| + \text{Min}(a, b), \\ b \end{cases}$$

and wherein:
   a represents a weighting factor in the first region, $$\frac{(\text{Max}Pt(x, y) - Pt(x, y))}{(\text{Max}Pt(x, y) - \text{Min}Pt(x, y))} *|a-b| + \text{Min}(a, b)$$

represents a weighting factor in the first sub-region,
   b represents a weighting factor in the second sub-region,
   Pt(x, y) represents a pixel value of each pixel point in the first sub-region,
   MaxPt(x, y) represents a maximum pixel value in the first sub-region, MinPt(x, y) represents a minimum pixel value in the first sub-region, and Min(a, b) represents a minimum value of a and b, and a and b are predetermined fixed values or, respectively, ratios of pixel point pixel values at corresponding positions in the first image and the first region and second sub-region of the second image.

9. The X-ray image processing system as claimed in claim 8, wherein the weighting factor $w1(x, y)$ satisfies the following formula:

$$w1(x,y)=1-w2(x,y).$$

* * * * *